United States Patent
Hada et al.

(10) Patent No.: US 12,202,510 B2
(45) Date of Patent: Jan. 21, 2025

(54) DISPLAY SYSTEM

(71) Applicant: NIPPON SEIKI CO., LTD., Niigata (JP)

(72) Inventors: Makoto Hada, Niigata (JP); Yusuke Sahara, Niigata (JP); Yuki Masuya, Niigata (JP); Midori Watanabe, Niigata (JP); Hanako Honma, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 15 days.

(21) Appl. No.: 18/458,625

(22) Filed: Aug. 30, 2023

(65) Prior Publication Data

US 2024/0101138 A1 Mar. 28, 2024

(30) Foreign Application Priority Data

Sep. 28, 2022 (JP) .................................. 2022-154327

(51) Int. Cl.
| | |
|---|---|
| *B60W 50/14* | (2020.01) |
| *B60K 35/00* | (2024.01) |
| *B60K 35/23* | (2024.01) |
| *B60K 35/28* | (2024.01) |
| *B60K 35/29* | (2024.01) |
| *B60K 35/81* | (2024.01) |

(52) U.S. Cl.
CPC ............. *B60W 50/14* (2013.01); *B60K 35/00* (2013.01); *B60K 35/23* (2024.01); *B60K 35/28* (2024.01); *B60K 35/29* (2024.01); *B60K 35/81* (2024.01); *B60K 2360/178* (2024.01); *B60K 2360/182* (2024.01); *B60W 2050/146* (2013.01)

(58) Field of Classification Search
CPC . B60W 50/14; B60W 2050/146; B60K 35/00; B60K 35/81; B60K 2360/178; B60K 35/28; B60K 35/23; B60K 35/29; B60K 2360/182

See application file for complete search history.

(56) References Cited

U.S. PATENT DOCUMENTS

| 9,975,427 B2 * | 5/2018 | Hisatsugu | .............. B60K 35/29 |
| 10,181,266 B2 * | 1/2019 | Gupta | ................... B60Q 9/008 |

(Continued)

FOREIGN PATENT DOCUMENTS

| JP | 2015043115 A | * | 3/2015 |
| JP | 2017-071398 A | | 4/2017 |

*Primary Examiner* — Chico A Foxx
(74) *Attorney, Agent, or Firm* — Rimon P.C.

(57) ABSTRACT

A display system includes: a first display device displaying an image in a first region to cause the image to be visually recognized in a position at a first distance from a visual line of a driver of an auto-vehicle; a second display device displaying an image in a second region to cause the image to be visually recognized at a second distance greater than the first distance from the visual line; and a display controller displaying a warning image in the second region if a first condition is satisfied, moving the warning image to display a warning image in the first region if a second condition in which a warning level is higher than that of the first condition is satisfied after the first condition is satisfied, then updating the warning image to an updated warning image, and then moving the updated warning image to the second region.

8 Claims, 8 Drawing Sheets

(56) References Cited

U.S. PATENT DOCUMENTS

| | | | |
|---|---|---|---|
| 10,630,946 B2* | 4/2020 | Oshima | H04N 9/3147 |
| 2016/0001693 A1* | 1/2016 | Tamura | G09G 5/12 |
| | | | 340/441 |
| 2019/0346676 A1* | 11/2019 | Hirata | G03B 21/14 |
| 2020/0082725 A1* | 3/2020 | Ichinokawa | B60K 35/00 |
| 2021/0155159 A1* | 5/2021 | Kawate | B60K 35/00 |
| 2022/0305913 A1* | 9/2022 | Nara | B60K 35/00 |
| 2023/0012768 A1* | 1/2023 | Oishi | B60Q 9/00 |

* cited by examiner

DISPLAY SYSTEM

CROSS REFERENCE TO RELATED APPLICATIONS

The present application claims priority from Japanese Patent Application No. 2022-154327 filed on Sep. 28, 2022, and the entire contents of which are hereby incorporated by reference.

TECHNICAL FIELD

The present disclosure relates to a display system for use in, for instance, a vehicle equipped with multiple display devices.

BACKGROUND ART

Conventionally, multiple display devices are arranged in multiple places in a vehicle so as to make the display devices cooperate with one another to display information.

PRIOR ART DOCUMENT

Patent Document

Patent Document 1: JP 2017-071398 A

SUMMARY OF INVENTION

Technical Problem

Today a vehicle is equipped with a head-up display allowing display of information in diverse display modes or a large-sized display panel allowing display of a mass of information. Attendant upon this, the amount and kind of information transmissible to a driver are increased. Consequently, it is even more required of a display apparatus to transmit necessary information to a driver with necessary timing and good visibility.

The present disclosure has been made in view of such circumstances, and is aimed at providing a display system excellent in information transmitting characteristics.

Solution to Problem

In order to solve the problem as above, a display system according to the present disclosure includes: a first display device 20 that displays an image in a first display region 8 to cause the image to be visually recognized in a position at a first display distance from a visual line 4a of a driver 4 of an auto-vehicle 1; a second display device 30 that displays an image in a second display region 9 different from the first display region 8 to cause the image to be visually recognized at a second display distance greater than the first display distance from the visual line 4a of the driver 4; and a display controller that performs a recognizability enhancement process for displaying a warning image 97 in the second display region 9 if a first condition is satisfied, moving the warning image 97 so as to display a warning image 87 in the first display region 8 if a second condition in which a warning level is higher than that of the first condition is satisfied after the first condition is satisfied, then updating the warning image 87 to an updated warning image 187 as an image identical to or different from the warning image 87, and then moving the updated warning image 187 to the second display region 9.

Advantageous Effects of Invention

The display system of the present disclosure is excellent in information transmitting characteristics.

DESCRIPTION OF EMBODIMENTS

An embodiment of a display system according to the present disclosure is described based on the accompanying drawings. The display system of the present disclosure is applicable to a display system that is to be installed in a vehicle such as an automobile and a two-wheeler, a ship, an agricultural machine or a construction machine. In the present embodiment, it is assumed that the display system of the present disclosure is installed in a vehicle and includes two head-up displays (HUDs) that display necessary information based on various kinds of information acquired from the vehicle, and the like.

Figure 1:
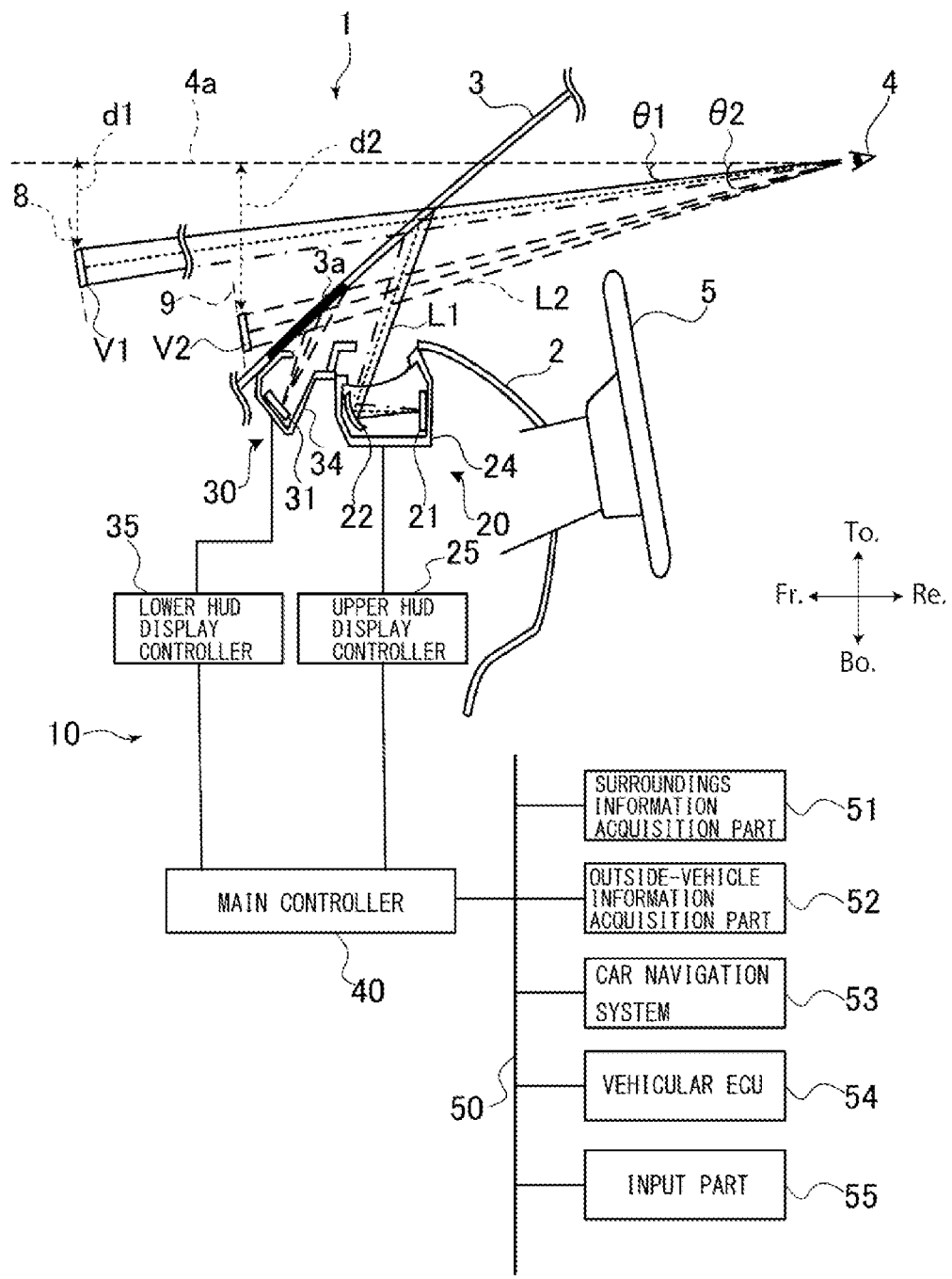
FIG. 1 is a diagram illustrating an exemplary system configuration of a display system according to an embodiment of the present disclosure.

FIG. 1 is a diagram illustrating an exemplary system configuration of a display system 10 of the present embodiment.

Figure 2:
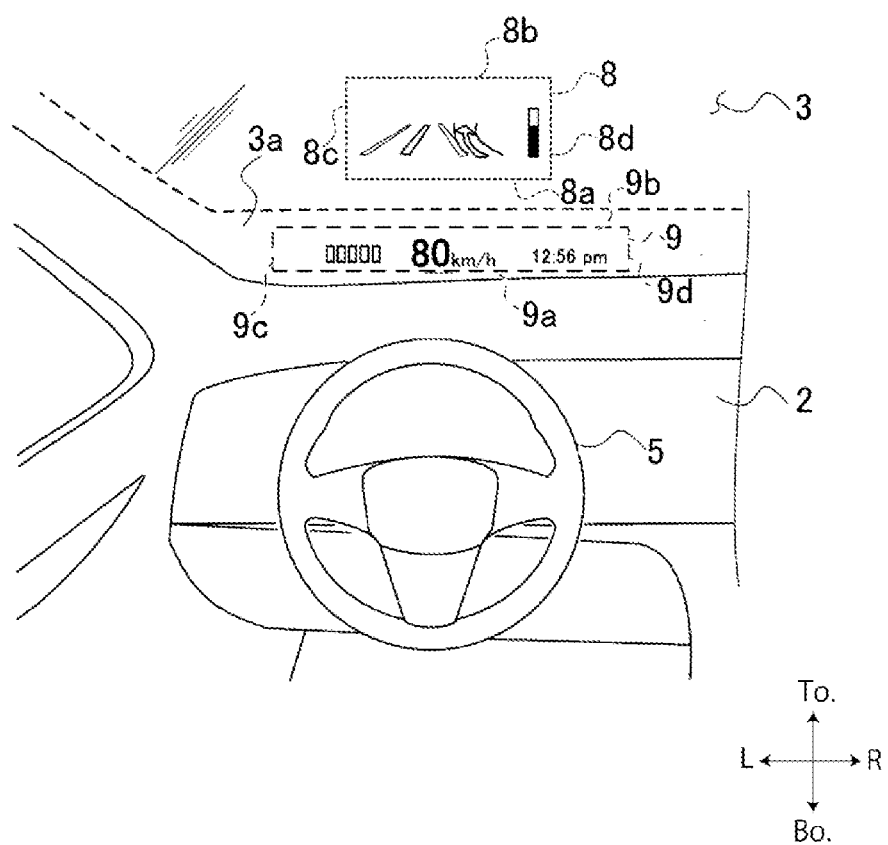
FIG. 2 is a diagram illustrating an example of display by two display devices.

FIG. 2 is a diagram illustrating an example of display by two display devices.

In the following description, definitions of "the front", "the rear", "the top", "the bottom", "the right", and "the left" follow definitions of "Fr.", "Re.", "To.", "Bo.", "R", and "L" in FIGS. 1 and 2.

The display system 10 is installed inside an instrument panel 2 of a vehicle 1 (as an auto-vehicle).

The display system 10 includes an upper HUD 20, a lower HUD 30, and a main controller 40.

The upper HUD 20 (as a first display device) is arranged ahead of a steering wheel 5 and illuminates a windshield 3 with a display light L1. The display light L1, which reflects from the windshield 3 toward a driver 4, allows the driver 4 to visually recognize an image from a virtual image V1 ahead of the vehicle 1. An image displayed by the upper HUD 20 is so displayed in, for instance, a hypothetical upper HUD display region 8 (first display region) in FIG. 2 as to be superimposed upon a front scene of a road surface or the like and as such visually recognized.

The lower HUD 30 (as a second display device) is arranged ahead of the upper HUD 20 (in a direction of separation from the driver 4) and illuminates a shade 3a formed in a peripheral portion of the windshield 3 with a display light L2. The shade 3a is a part with a shading color such as black that is made of black ceramics, for instance. The shade 3a is formed in order to prevent an adhesive for securing the windshield 3 to the vehicle 1 from deteriorating due to sunlight, to keep the adhesive out of sight, to refine the design, and the like. The display light L2, which reflects from the shade 3a toward the driver 4, allows the driver 4 to visually recognize an image from a virtual image V2 ahead of the vehicle 1. An image displayed by the lower HUD 30 is so displayed in, for instance, a hypothetical lower HUD display region 9 (second display region) in FIG. 2 that is different from the upper HUD display region 8, as to be visually recognized ahead of the shade 3a.

The upper HUD 20 displays an image so that the image from the virtual image V1 may visually be recognized in a position at a distance d1 (first display distance) in a top and bottom direction from a visual line 4a of the driver 4 that is normally assumed (during the driving). The lower HUD 30 displays an image so that the image from the virtual image V2 may visually be recognized in a position at a distance d2 (second display distance) greater than the distance d1 from the visual line 4a of the driver 4. Thus, as compared with a displacement distance for the driver 4 to displace the visual line 4a to an image according to the display light L1, a displacement distance to displace the visual line 4a to an image according to the display light L2 is greater. In other words, as compared with an angle θ1 between a direction of the visual line 4a and a direction of a visual line for visually recognizing the image from the virtual image V1, an angle θ2 between the direction of the visual line 4a and a direction of a visual line for visually recognizing the image from the virtual image V2 is larger. Consequently, the driver 4 visually recognizes the image displayed by the lower HUD 30, which is farther from the visual line 4a than the image displayed by the upper HUD 20, below the image displayed by the upper HUD 20.

In the present embodiment, the upper HUD 20 forms the virtual image V1 ahead of the virtual image V2 formed by the lower HUD 30. In other words, the image from the virtual image V1 is visually recognized in a position far in a front and rear direction from the driver 4, and the image from the virtual image V2 is visually recognized in a position close in the front and rear direction to the driver 4.

Display faces defined as the upper HUD display region 8 and the lower HUD display region 9 each have four sides, top and bottom, left and right, with bottom sides 8a and 9a and top sides 8b and 9b being substantially parallel to one another in a left and right direction, for instance. Of the display faces, left sides 8c and 9c and right sides 8d and 9d are set at any angles with respect to the top and bottom direction. For instance, the display faces are formed as faces with the left sides 8c and 9c and right sides 8d and 9d extending in the top and bottom direction (faces perpendicular to the road surface), faces tilted at a specified angle with respect to the top and bottom direction (faces tilted with respect to the road surface), or faces extending in the front and rear direction (faces superimposed upon (substantially parallel to) the road surface). The display faces may be formed so that the left sides 8c and 9c and the right sides 8d and 9d may be so curved as to extend in the top and bottom direction in portions close to a visual recognizer and extend in the front and rear direction in farther portions. If the display faces are formed as faces not perpendicular to the road surface, display distances between the driver 4 and the virtual images V1 and V2 vary with display positions on the display faces, so that it is possible to display an image with an impression of depth. If the display faces are faces whose left sides 8c and 9c and right sides 8d and 9d are so tilted as to put the top sides 8b and 9b ahead of the bottom sides 8a and 9a, for instance, the driver 4 is able to perceive the depth in the display faces.

Information on the visual line 4a (a visual point) of the driver 4 for calculating a display distance of an image and the like may be set in advance and held by the main controller 40 or may be detected by a sensor for detecting the visual point of the driver 4 if the vehicle 1 or the display system 10 includes such sensor.

The upper HUD 20 includes a display device 21, a concave mirror 22, a housing 24, and an upper HUD display controller 25.

The display device 21 emits the display light L1 toward the concave mirror 22. The display device 21 is a thin film transistor (TFT) liquid crystal display device or an organic electroluminescence (EL) display device, for instance. The display device 21 may include a projector and a screen constituting a display face.

The concave mirror 22 reflects the display light L1 emitted by the display device 21 toward the windshield 3. The concave mirror 22 serves as a magnifier, and magnifies an image displayed on the display device 21 so as to reflect the magnified image toward the windshield 3. Thus, the driver 4 visually recognizes an image obtained by magnifying the image displayed on the display device 21.

The housing 24 supports, inside the housing 24, a control circuit board that the concave mirror 22, the display device 21, and the upper HUD display controller 25 are mounted on.

The upper HUD display controller 25 includes a central processing unit (CPU), a read-only memory (ROM), and a random access memory (RAM), and performs specified arithmetic processing in accordance with programs written in the ROM. Specifically, the upper HUD display controller 25 controls the display device 21 based on an instruction from the main controller 40, so as to display a necessary image.

The lower HUD 30 includes a display device 31, a housing 34, and a lower HUD display controller 35.

The display device 31 emits the display light L2 directly to the shade 3a outside the housing 34. The display device 31 is the same in configuration as the upper HUD 20, for instance. As a result, the driver 4 visually recognizes an image displayed on the display device 31 and reflected by the shade 3a.

The housing 34 supports, inside the housing 34, a control circuit board that the display device 31 and the lower HUD display controller 35 are mounted on.

The lower HUD display controller 35 includes a CPU, a ROM, and a RAM, and performs specified arithmetic processing in accordance with programs written in the ROM. Specifically, the lower HUD display controller 35 controls the display device 31 based on an instruction from the main controller 40, so as to display a necessary image.

The main controller 40 controls the upper HUD 20 and the lower HUD 30 particularly based on information and the like acquired from respective parts of the vehicle 1 to be described later. The main controller 40 includes a CPU, a ROM, and a RAM, and performs specified arithmetic processing and display control processing to be described later, in accordance with programs written in the ROM.

In addition to the display system 10, the vehicle 1 includes a surroundings information acquisition part 51, an outside-vehicle information acquisition part 52, a car navigation system 53, and a vehicular electronic control unit (ECU) 54. The respective parts are connected to the main controller 40 through a controller area network (CAN) bus 50, for instance.

The surroundings information acquisition part 51 acquires information on the surroundings (outside) of the vehicle 1. The surroundings information acquisition part 51 allows the vehicle 1 to communicate with a wireless network, communicate with another vehicle, communicate with a pedestrian, and to communicate with an infrastructure on the road side. For instance, the surroundings information acquisition part 51 includes a communications module capable of directly accessing a wide area network (WAN), an external device (such as a mobile router) capable of accessing a WAN or a communications module for communicating with an access point of a public wireless local area network (LAN) so as to handle the Internet communications.

The surroundings information acquisition part 51 also includes a wireless communications module conforming to a specified wireless communications standard. In addition, the surroundings information acquisition part 51 includes a communications device handling wireless communications with an infrastructure on the road side, and acquires, through wireless equipment arranged on the road side as an infrastructure, object information and traffic information from a base station of driving safety support systems (DSSS), for instance.

The outside-vehicle information acquisition part 52 detects contents and a position of a target, such as a person, a structure, and another vehicle 1, present in an external environment around the vehicle 1, that is to say, on all sides of the vehicle 1. The outside-vehicle information acquisition part 52 is constituted of a stereo camera for capturing an image of scenery around the vehicle 1, a distance measurement sensor, such as a laser imaging detection and ranging (LIDAR) device, for measuring the distance from the vehicle 1 to the target, or a sonar, ultrasonic sensor or millimeter wave radar for detecting the target located around the vehicle 1, for instance.

The car navigation system 53 includes a global positioning system (GPS) controller for calculating a position of the vehicle 1 based on a GPS signal received from a satellite or the like. The car navigation system 53 includes a storage for storing map data, and reads map data on the vicinity of a current position from the storage based on position information from the GPS controller so as to decide a guidance route to a destination set by a user. The car navigation system 53 outputs information concerning the current position of the vehicle 1 and the decided guidance route, to the main controller 40.

The car navigation system 53 refers to the map data so as to output, to the main controller 40, information indicating the name and type of a facility ahead of the vehicle 1, the distance between the facility and the vehicle 1, and the like. In the map data, various kinds of information, including road shape information (on a lane, the road width, the number of lanes, an intersection, a curve, a forked road, and the like), traffic information concerning a traffic sign for a speed limit or the like and traffic regulation such as suspension of traffic, one-way alternate traffic, and speed regulation, and information on respective lanes if multiple lanes are present, are associated with position data. The car navigation system 53 outputs such various kinds of information to the main controller 40. The car navigation system 53 is not limited to the car navigation system, which is installed in the vehicle 1, but may be realized by a portable terminal (smartphone or tablet personal computer (PC), for instance) that communicates with the main controller 40 in a wired or wireless manner and has a car navigation function.

The vehicular ECU 54 acquires vehicle information required for the travel of the vehicle 1, namely, information on a vehicular speed, an engine speed, and the like from various sensors provided on the vehicle 1 so as to control the movement of the vehicle 1. The vehicular ECU 54 outputs necessary vehicle information, such as warning information on the vehicular speed or the vehicle 1 itself (information indicating reduction in fuel or abnormality in engine oil pressure, for instance), to the main controller 40.

Next, image display control exerted by the display system 10 is described in detail. The display system 10 performs a recognizability enhancement process if a specified condition is satisfied.

Figure 3:
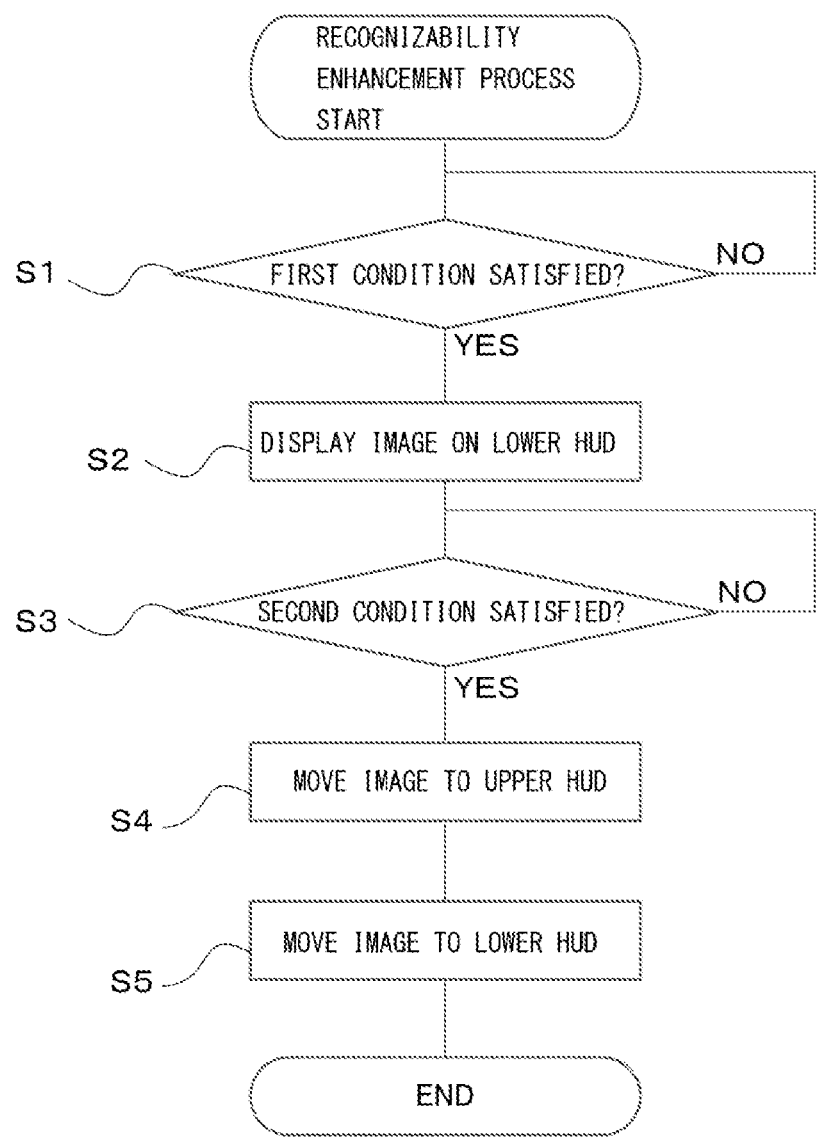
FIG. 3 is a flowchart for explaining a recognizability enhancement process performed by a main controller.

FIG. 3 is a flowchart for explaining a recognizability enhancement process performed by the main controller 40. The recognizability enhancement process is a process for displaying a warning image in the lower HUD display region 9 (step S2) if a first condition is satisfied (YES in step S1), moving the warning image so as to display the warning image in the upper HUD display region 8 (step S4) if a second condition in which a warning level is higher than that of the first condition is satisfied (YES in step S3) after the first condition is satisfied, and then moving (restoring) the warning image to the lower HUD display region 9 so as to display the warning image in the region 9 (step S5).

Therefore, the display system 10 of the present embodiment includes the upper HUD 20, which displays an image in a position requiring a small amount of displacement of the visual line 4a of the driver 4 (namely, a position close to the visual line 4a) so as to make the image recognizable to the driver 4, and the lower HUD 30, which displays an image in a position requiring an amount of displacement of the visual line 4a that is larger than the amount of displacement in the case with the upper HUD 20 (namely, a position farther from the visual line 4a) so as to make the image relatively less recognizable to the driver 4. The display system 10 causes the upper HUD 20 and the lower HUD 30 as above to cooperate with each other, so as to display an image with the upper HUD 20, which makes the image easy to recognize, and appropriately transmit information to the driver 4 in a situation in which a warning level is high. In the following, a specific example is used to describe the recognizability enhancement process in FIGS. 3 through 12.

Specific Example

Assumed as a specific example is a recognizability enhancement process that is performed when the upper HUD 20 and the lower HUD 30 display warning images (sign images 87 and 97) indicating traffic information located ahead. The following description is made using an example where the traffic information is information on a traffic sign representing a speed limit.

Figure 4:
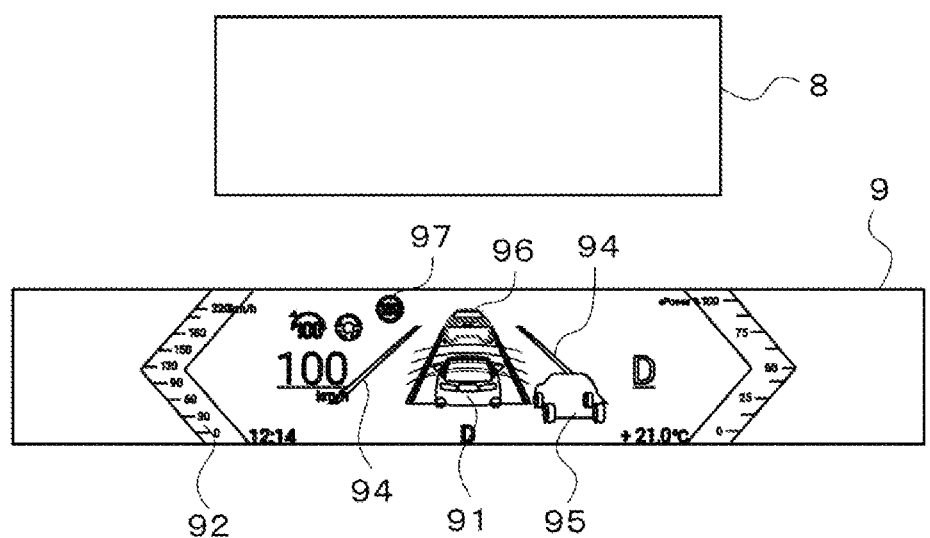
FIG. 4 is a diagram illustrating an exemplary display before recognizability processing as a specific example is performed.

As illustrated in FIG. 4, an auto-vehicle image 91 indicating the vehicle 1, a vehicular speed image 92 related to vehicular speed information acquired from the vehicular ECU 54, an image related to information concerning surrounding vehicles around the vehicle 1, which information is acquired from the outside-vehicle information acquisition part 52 or the like, and a lane marker image 94 indicating information concerning a lane marker of a travel lane where the vehicle 1 travels are displayed in the lower HUD display region 9. The image related to information concerning surrounding vehicles includes a rearward vehicle image 95 related to information concerning a rearward vehicle traveling behind the vehicle 1 and a forward vehicle image 96 related to information concerning a forward vehicle traveling ahead, and indicates a relative, positional relationship along with the auto-vehicle image 91. The rearward vehicle image 95 and the forward vehicle image 96 are displayed if the rearward vehicle and the forward vehicle exist.

In the lower HUD display region 9, the sign image 97 related to information concerning a traffic sign being applied to the vehicle 1, which is currently in the course of traveling, is displayed with necessary timing. In the present specific example, the sign image 97 indicates a speed limit sign representing a speed limit of 100 km/h. The contents of the traffic sign may be information concerning a regulation sign representing a prohibition item such as prohibition of passing, or other traffic sign.

It is also possible to display multiple sign images 97 in the lower HUD display region 9, and it is preferable in that case that a sign image 97 of high importance concerning the speed limit is displayed in a portion near the center of the lower HUD display region 9 where the displayed image is easily recognized by the driver 4. At this time, there is no information urging recognition, so that no images are displayed in the upper HUD display region 8.

The main controller 40 determines whether the first condition, namely, a condition that the surroundings information acquisition part 51 or the outside-vehicle information acquisition part 52 detects traffic information concerning a traffic sign located ahead of the vehicle 1 or traffic regulation or that the car navigation system 53 acquires the traffic information concerning a traffic sign located ahead of the vehicle 1 or traffic regulation is satisfied (step S1 in FIG. 3).

If determining that the first condition is not satisfied (NO in step S1), the main controller 40 remains on standby until the first condition is satisfied.

Figure 5:
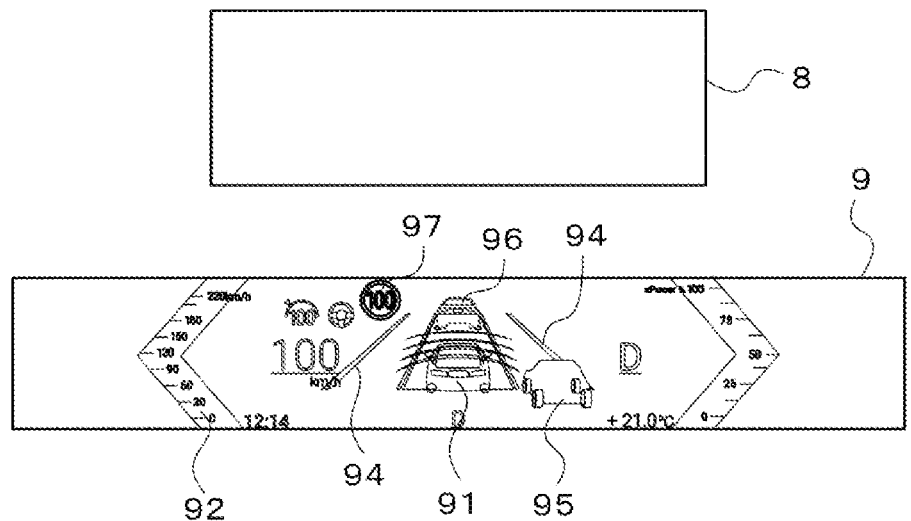
FIG. 5 is a diagram illustrating an exemplary display of a warning image in step S2 of a recognizability enhancement process as a specific example.

If determining that the first condition is satisfied (YES in step S1), the main controller 40 controls the lower HUD display controller 35 so as to magnify and display the sign image 97 in the identical position as illustrated in FIG. 5 (step S2). At the same time, the lower HUD display controller 35 displays images other than the sign image 97 with a lowered lightness (brightness) of display. In this regard, the lower HUD display controller 35 may display the sign image 97 in a flashing manner in order to allow the driver 4 to recognize more clearly that the vehicle 1 is approaching the traffic sign.

The main controller 40 determines whether the second condition, namely, a condition that the distance between the traffic sign and the vehicle 1 is equal to or smaller than a specified distance is satisfied (step S3 in FIG. 3). The specified distance is smaller than a distance between the traffic sign and the vehicle 1 having been found when the traffic sign was detected. In other words, the main controller 40 determines whether a time to apply the speed limit as the contents of the traffic sign to the vehicle 1 has come (drew near), at the same time as the situation has a warning level higher than that of the case where the first condition for causing the driver 4 to recognize a time when the sign image 97 as displayed in the lower HUD display region 9 is to be updated is satisfied.

Figure 6:
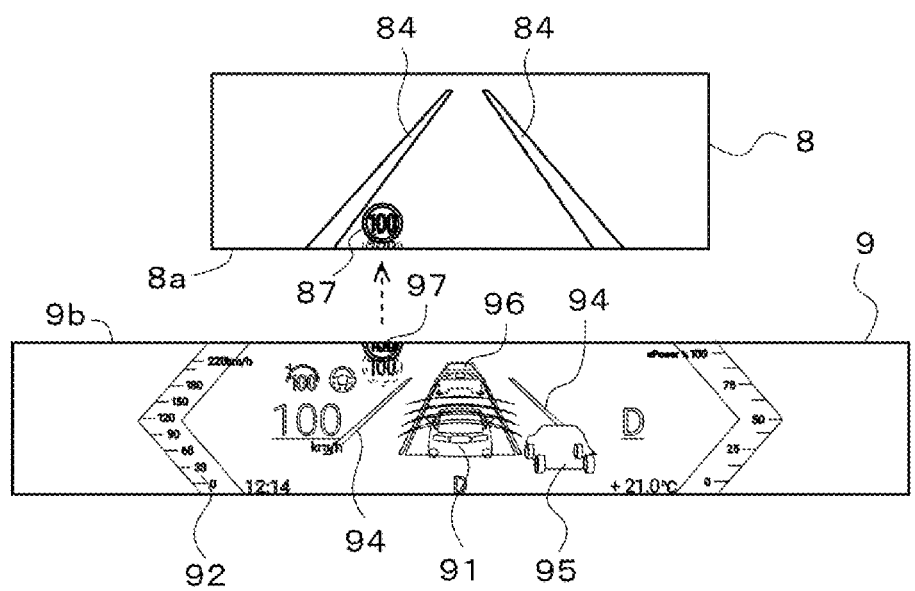
FIG. 6 is a diagram illustrating another exemplary display of the warning image in step S4 of the recognizability enhancement process as a specific example.

If determining that the second condition is not satisfied (NO in step S3), the main controller 40 keeps the sign image 97 displayed in the lower HUD display region 9. If determining that the second condition is satisfied (YES in step S3), the main controller 40 controls the lower HUD display controller 35 so as to move the sign image 97 toward the upper HUD display region 8 and make the sign image 97 invisible over the top side 9b of the lower HUD display region 9 as illustrated in FIG. 6. The lower HUD display controller 35 restores the images other than the sign image 97 to the original lightness of display at the same time as the sign image 97 is completely deleted from the lower HUD display region 9.

At the same time as the sign image 97 is completely deleted from the lower HUD display region 9, the upper HUD display controller 25 causes the sign image 87 to gradually emerge from the bottom side 8a of the upper HUD display region 8, so as to move the sign image 87 straightforward in the top and bottom direction and thus display the sign image 87. The sign image 87 to be displayed at this time is so formed as to appear to the driver 4 to have the same size as the magnified sign image 97 had. The upper HUD display controller 25 causes the sign image 87 to emerge from a position just above (position identical in the left and right direction to) a position where the sign image 97 was displayed in the lower HUD display region 9, so as to display the sign image 87. In this regard, the upper HUD display controller 25 may display the sign image 87 in a flashing manner in order to allow the driver 4 to recognize more clearly that the vehicle 1 is approaching the traffic sign.

In order that the sign image 87 appears to the driver 4 to have the same size as the magnified sign image 97 had, the sign image 87 actually displayed in the upper HUD display region 8 is so formed as to be in size than the sign image 97 actually displayed in the lower HUD display region 9.

The sign image 97 is thus caused to appear to move toward the sign image 87, so that a feeling of cooperation in display between the upper HUD 20 and the lower HUD 30 is improved.

Figure 7:
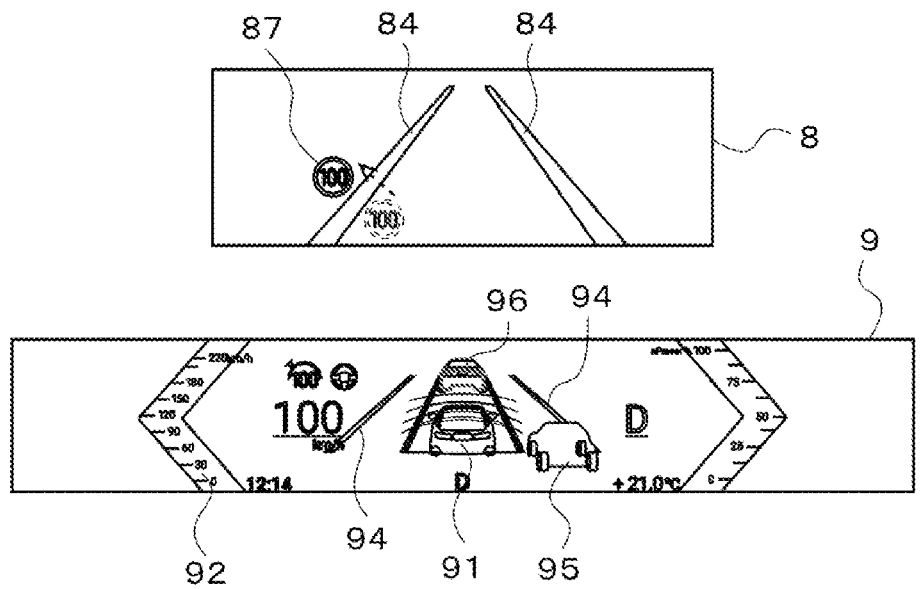
FIG. 7 is a diagram illustrating an exemplary display of the warning image in step S4 of the recognizability enhancement process as a specific example.

A specified time (not longer than one second) after the sign image 87 is displayed at the bottom side 8a of the upper HUD display region 8, the upper HUD display controller 25 displays a lane marker image 84 modeled on a lane so that the image 84 may be superimposed upon a lane on the road surface ahead of the vehicle 1, as illustrated in FIG. 6. A specified time (not longer than one second) after the lane marker image 84 is displayed in the upper HUD display region 8, the upper HUD display controller 25 moves the sign image 87 straightforward to a position outside the lane marker image 84 (position on the left side 8c side of the lane marker image 84) as illustrated in FIG. 7.

Figure 8:
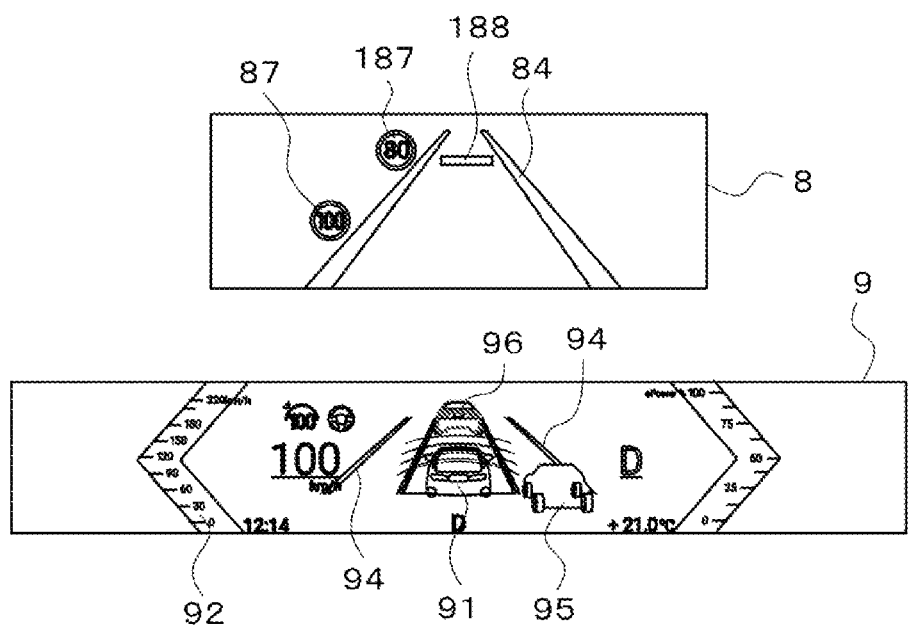
FIG. 8 is a diagram illustrating an exemplary display of the warning image in step S4 of the recognizability enhancement process as a specific example.

A specified time (not longer than one second) after the sign image 87 is moved to the position outside the lane marker image 84, the upper HUD display controller 25 displays an updated sign image (updated warning image) 187 different from the sign image 87 in an upper position outside the lane marker image 84 (position on the top side 8b side of the lane marker image 84), and displays a stop line-like line 188 on an accompanying traffic lane as illustrated in FIG. 8. In the present specific example, the updated sign image 187 indicates a speed limit sign representing a speed limit of 80 km/h.

Figure 9:
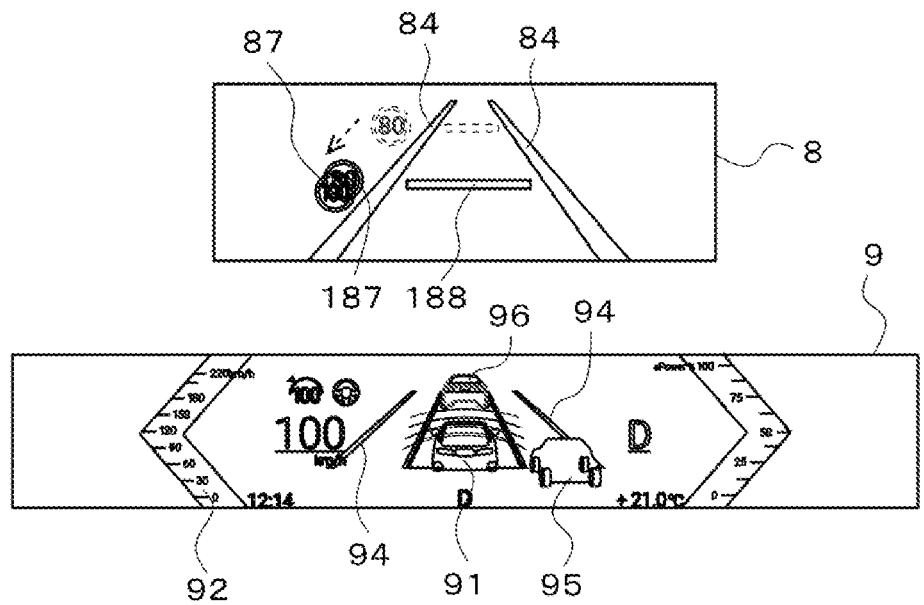
FIG. 9 is a diagram illustrating an exemplary display of the warning image in step S4 of the recognizability enhancement process as a specific example.

A specified time (not longer than one second) after the updated sign image 187 is displayed in the upper HUD display region 8, the upper HUD display controller 25 moves the updated sign image 187 straightforward along the lane marker image 84 toward the sign image 87 as illustrated in FIG. 9.

At this time, the upper HUD display controller 25 makes the updated sign image 187 closer to the sign image 87 as the vehicle 1, which is traveling, approaches the traffic sign. As a result, the upper HUD display controller 25 allows the driver 4 to recognize that the vehicle 1 is approaching the traffic sign, which will come to be applied to the vehicle 1. When the distance between the traffic sign and the vehicle 1 has become small (about 30 m), the upper HUD display controller 25 superimposes the updated sign image 187 on the sign image 87, and deletes the sign image 87 so as to display the updated sign image 187 instead at the time when the images 87 and 187 are entirely on top of each other, which allows the driver 4 to recognize that a change in traffic sign has been made. The upper HUD display controller 25 deletes the line 188 with the deletion of the sign image 87.

The upper HUD display controller 25 may display the updated sign image 187 and the line 188 in a flashing manner in order to allow the driver 4 to recognize more clearly that the updated sign image 187 is moving.

Figure 10:
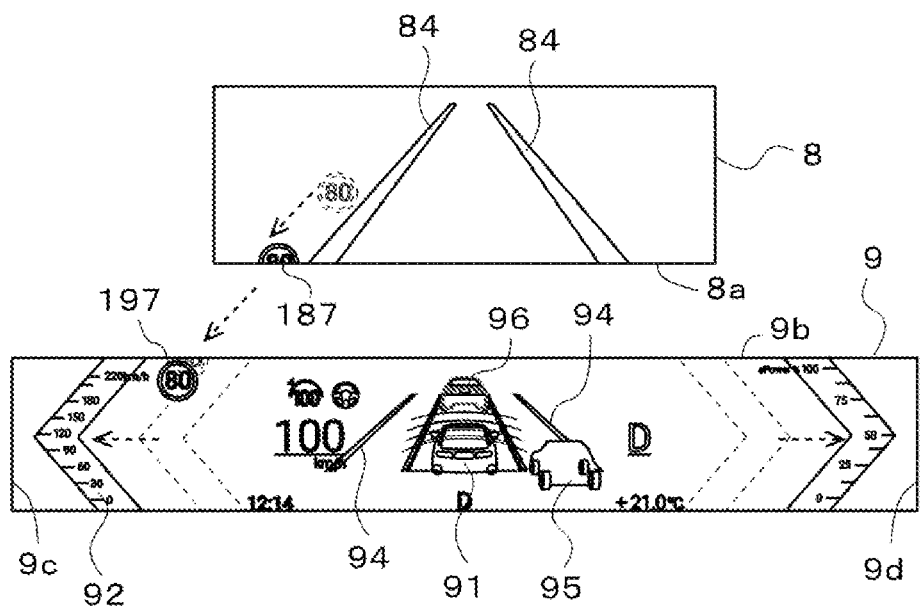
FIG. 10 is a diagram illustrating an exemplary display of the warning image in steps S4 and S5 of the recognizability enhancement process as a specific example.

A specified time (three to five seconds) after the updated sign image 187 has been superimposed on the sign image 87, and if the vehicle 1 passes through the traffic sign, the upper HUD display controller 25 moves the updated sign image 187 straightforward along the lane marker image 84 toward the lower HUD display region 9 and eventually to the bottom side 8*a* as illustrated in FIG. 10.

At the same time, the lower HUD display controller 35 moves vehicular speed images 92 making a pair to the left side 9*c* and the right side 9*d*, respectively, so as to form display spaces in places where the vehicular speed images 92 were displayed.

If the movement of the updated sign image 187 to the bottom side 8*a* and the movement of one vehicular speed image 92 to the left side 9*c* are completed, the upper HUD display controller 25 moves the updated sign image 187 toward the lower HUD display region 9 so as to make the updated sign image 187 invisible over the bottom side 8*a* of the upper HUD display region 8. The upper HUD display controller 25 makes the updated sign image 187 invisible while moving the image 187 obliquely downward along a hypothetical extension line of the lane marker image 84 in the upper HUD display region 8.

If the updated sign image 187 disappears from the upper HUD display region 8, the lower HUD display controller 35 causes an updated sign image (updated warning image) 197 to gradually emerge from the top side 9*b* of the lower HUD display region 9, so as to display the image 197. The updated sign image 197 is moved to a position the same in the top and bottom direction as a position where the sign image 97 was arranged before the first condition was satisfied. At this time, the updated sign image 197 is so formed as to appear to the driver 4 to have the same size as the updated sign image 187 had. The upper HUD display controller 25 deletes the lane marker image 84 if the updated sign image 187 disappears from the upper HUD display region 8.

In order that the updated sign image 197 appears to the driver 4 to have the same size as the updated sign image 187 had, the updated sign image 197 actually displayed in the lower HUD display region 9 is so formed as to be \ in size than the updated sign image 187 actually displayed in the upper HUD display region 8.

The updated sign image 187 is thus caused to appear to move toward the updated sign image 197, so that the feeling of cooperation in display between the upper HUD 20 and the lower HUD 30 is improved.

Figure 11:
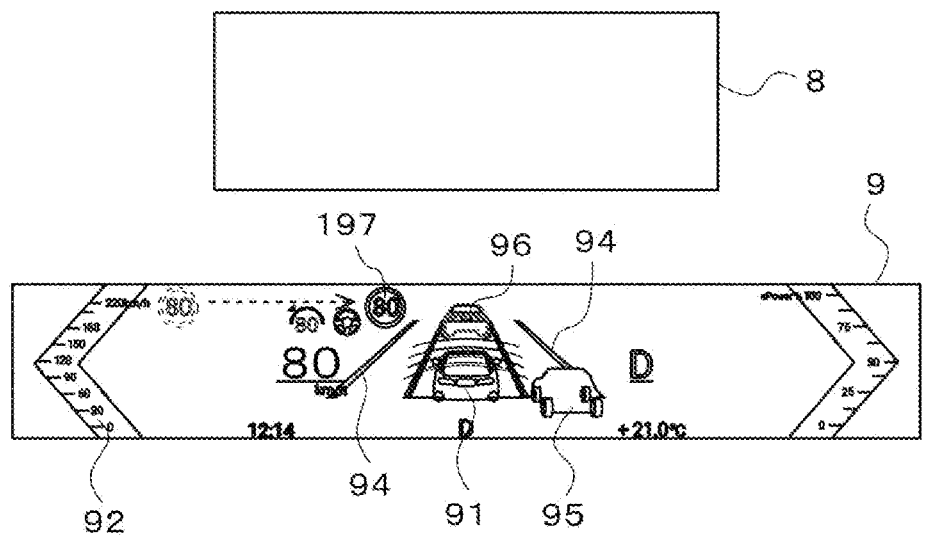
FIG. 11 is a diagram illustrating an exemplary display of the warning image in step S5 of the recognizability enhancement process as a specific example.

A specified time (not longer than one second) after the updated sign image 197 is displayed at the top side 9*b* of the lower HUD display region 9, the lower HUD display controller 35 moves the updated sign image 197 straightforward to the position where the sign image 97 was arranged before the first condition was satisfied, as illustrated in FIG. 11.

Figure 12:
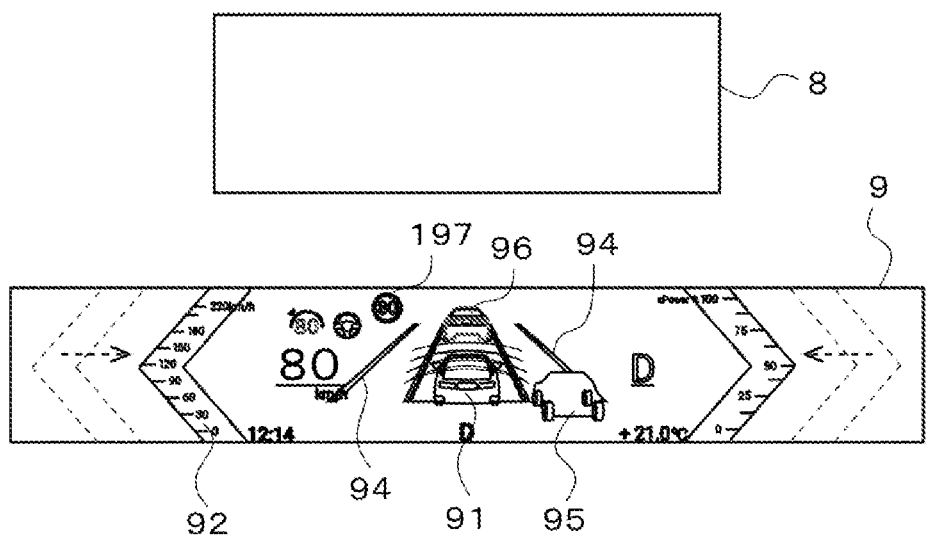
FIG. 12 is a diagram illustrating an exemplary display of the warning image in step S5 of the recognizability enhancement process as a specific example.

A specified time (not longer than one second) after the updated sign image 197 is moved, the vehicular speed images 92 are restored to the original positions and the updated sign image 197 is reduced in the identical position to the same size as the sign image 97 had before the first condition was satisfied, and as such displayed as illustrated in FIG. 12.

Consequently, the main controller 40 allows the sign image 97 displayed in the lower HUD display region 9 to appear to move to the upper HUD display region 8 and then come back to the lower HUD display region 9 after being updated. In other words, the main controller 40 displays the sign image 97 in the upper HUD display region 8 in order to enhance the recognizability of the traffic sign, which will come to be applied to the vehicle 1, and thus warns the driver 4.

Therefore, the display system 10 uses the upper HUD 20 and the lower HUD 30 effectively to transmit necessary information to the driver 4 as appropriate.

In the above description, the sign images 87 and 97 are each assumed as an image indicating a traffic sign concerning the speed limit, while images of multiple kinds of traffic signs may be displayed in the upper HUD display region 8 and the lower HUD display region 9 as the sign images 87 and 97. If the sign image 97 concerning the speed limit and a sign image concerning the prohibition of passing are displayed in the lower HUD display region 9, and a traffic sign concerning the speed limit that is to change a current speed limit and a traffic sign of the same kind as the traffic sign indicated by the sign image concerning the prohibition of passing (traffic sign concerning prohibition of parking and stopping, for instance) exist ahead, for instance, the upper HUD display controller 25 may display, in the upper HUD display region 8, multiple sign images indicating traffic signs located ahead. If such sign images are to be moved, the upper HUD display controller 25 moves the respective sign images obliquely downward, that is to say, toward the corresponding sign images of the same kind in the lower HUD display region 9 so as to give the impression of depth, which improves visual effects.

As another example, if the vehicle 1 follows the contents of the sign image 97 while the sign image 97 is displayed in the lower HUD display region 9, the main controller 40 may determine that the driver 4 has recognized the sign image 97 and turn off the sign image 97 in the lower HUD display region 9. To be specific: If the vehicular speed has become 100 km/h or lower while the sign image 97 indicating a speed limit of 100 km/h is displayed in the lower HUD display region 9, the lower HUD display controller 35 may turn off the sign image 97.

During the turn off of the sign image 97, the lower HUD display controller 35 may display a current vehicular speed along with the sign image 97 so as to notify that the current vehicular speed falls within the speed limit according to the sign image 97. In addition to or instead of this, the lower HUD display controller 35 can, during the turn off of the sign image 97, do visual arrangements to make the sign image 97 shine, contain bold letters, flash, rotate, hop or the like, so as to notify more clearly that the current vehicular speed falls within the speed limit.

If it has been found that the vehicular speed does not follow the sign image 97 displayed in the lower HUD display region 9, the main controller 40 may perform the recognizability enhancement process even if the sign indicated by the updated sign image 187 is identical to the sign indicated by the sign image 87.

The main controller 40 displays the sign image 97, which indicates the sign as currently applied to the vehicle 1, in the lower HUD display region 9 (step S2 following YES in step S1 in FIG. 3). The main controller 40 determines whether the second condition, namely, a condition that the vehicle 1 falls without the current speed limit displayed with the sign image 97 is satisfied (step S3 in FIG. 3). For instance, the main controller 40 determines whether a condition that the vehicular speed is over the speed limit or a condition that a speed set by an adaptive cruise control is over the speed limit is satisfied.

If determining that the second condition is satisfied (YES in step S3), the main controller 40 controls the lower HUD display controller 35 so as to move the sign image 97 toward the upper HUD display region 8, in accordance with the recognizability enhancement process as above (step S4 in FIG. 3). Subsequently, the main controller 40 controls the upper HUD display controller 25 so as to display the sign image 87 near the bottom side 8a of the upper HUD display region 8, move the sign image 87 to the position outside the lane marker image 84, replace the sign image 87 by the updated sign image 187 indicating the identical sign, and move the updated sign image 187 toward the lower HUD display region 9 (step S5 in FIG. 3). Thereafter, the main controller 40 controls the lower HUD display controller 35 so as to move the updated sign image 197 to the position where the sign image 97 was arranged and reduce the updated sign image 197 to the same size as the former sign image 97 had. The display system 10 displays the sign image 97 in the upper HUD display region 8 as the sign image 87, which makes it possible to improve the recognizability of a warning and appropriately transmit the warning to the driver 4.

An exemplary embodiment of the present invention has been described above without intending to limit the scope of the invention to the embodiment. This novel embodiment can be implemented in various other modes, and it is possible to make various omissions, replacements, and changes without departing from the gist of the invention. The above embodiment and modifications thereof fall within the scope and gist of the invention, and fall within the scope of the invention and equivalents thereof as recited in the claims.

As an example, the first display device and the second display device are each described above as a HUD, while both or either of the first and second display devices may be a display device that causes a real image displayed on a display panel of a TFT liquid crystal display device, an organic EL display device or the like to be visually recognized.

In the above embodiment, the windshield 3 constitutes a projection member for the upper HUD 20 and the lower HUD 30, while, instead of or in addition to this, the projection member may be constituted of a combiner.

The first and second conditions and warning images as used in the specific example are each presented as an example, and conditions and warning images may be set as appropriate. If information (an image) displayed in the lower HUD display region 9 (second display region) is moved to and displayed in the upper HUD display region 8 (first display region) or information displayed in the upper HUD display region 8 (first display region) is moved to and displayed in the lower HUD display region 9 (second display region), it is not indispensable to move information in the lower HUD display region 9 or to move information in the upper HUD display region 8. Information may be turned off on the spot without moving and then caused to emerge in the upper HUD display region 8 or the lower HUD display region 9. In that case, the turn off of information may or may not be carried out in a faded-out manner, and the emergence of information may or may not be carried out in a faded-in manner.

In the specific example, as illustrated in FIG. 7, the sign image 87 in the upper HUD display region 8 is moved from the bottom side 8a of the upper HUD display region 8 to the position outside the lane marker image 84 before being replaced by the updated sign image 187, while the sign image 87 may be replaced by the updated sign image 187 at the bottom side 8a without moving.

REFERENCE SIGNS LIST

1 vehicle (auto-vehicle)
2 instrument panel
3 windshield
3a shade
4 driver
4a visual line
5 steering wheel
8 upper HUD display region (first display region)
9 lower HUD display region (second display region)
8a, 9a bottom side
8b, 9b top side
8c, 9c left side
8d, 9d right side
10 display system
20 upper HUD (first display device)
21, 31 display device
22 concave mirror
24, 34 housing
25 upper HUD display controller
30 lower HUD (second display device)
35 lower HUD display controller
40 main controller
50 CAN bus
51 surroundings information acquisition part
52 outside-vehicle information acquisition part
53 car navigation system
54 vehicular ECU
84, 94 lane marker image
96 forward vehicle image
87, 97 sign image (warning image)
91 auto-vehicle image
92 vehicular speed image
95 rearward vehicle image
187, 197 updated sign image
188 line
L1, L2 display light
V1, V2 virtual image
d1, d2 distance
θ1, θ2 angle

The invention claimed is:

1. A display system comprising:
a first display device to display an image in a first display region to cause the image to be visually recognized in a position at a first display distance from a visual line of a driver of an auto-vehicle;
a second display device to display an image in a second display region different from the first display region to cause the image to be visually recognized at a second display distance greater than the first display distance from the visual line of the driver; and
a display controller to perform a recognizability enhancement process for displaying a warning image in the second display region if a first condition is satisfied, moving the warning image to display the warning image in the first display region if a second condition in which a warning level is higher than that of the first condition is satisfied after the first condition is satisfied, then updating the warning image to an updated warning image as an image identical to or different from the warning image, and then moving the updated warning image to the second display region.

2. The display system according to claim 1, wherein
the warning image and the updated warning image are each an image indicating information concerning traffic information located ahead of the auto-vehicle,
the second condition refers to a case where the display controller has detected the traffic information, which should be notified to the driver,
the first condition is a condition that a distance between the traffic information and the auto-vehicle is equal to or smaller than a specified distance smaller than a distance between the traffic information and the auto-vehicle found when the traffic information is detected, and
the display controller performs the recognizability enhancement process if the second condition is satisfied after the first condition is satisfied.

3. The display system according to claim 1, wherein the warning image is magnified and as such displayed if the first condition is satisfied.

4. The display system according to claim 1, wherein the warning image, in the same size, is moved straightforward to the first display region, which is right above the second display region, if the second condition is satisfied.

5. The display system according to claim 1, wherein the warning image is updated after being moved to the first display region and then moved to a position outside a lane marker image modeled on a lane.

6. The display system according to claim 2, wherein the warning image is updated after the updated warning image is so moved in the first display region as to come closer to the warning image as the distance between the traffic information and the auto-vehicle becomes smaller.

7. The display system according to claim 1, wherein a space is formed in the second display region after update of the warning image, and the updated warning image is moved from the first display region to the space.

8. The display system according to claim 1, wherein the updated warning image is reduced and as such displayed after being moved from the first display region to the second display region.

* * * * *